United States Patent
Lanman et al.

(10) Patent No.: US 10,859,832 B1
(45) Date of Patent: Dec. 8, 2020

(54) MITIGATING LIGHT EXPOSURE TO ELEMENTS OF A FOCUS ADJUSTING HEAD MOUNTED DISPLAY

(71) Applicant: Facebook Technologies, LLC, Menlo Park, CA (US)

(72) Inventors: Douglas Robert Lanman, Bellevue, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 78 days.

(21) Appl. No.: 15/992,145

(22) Filed: May 29, 2018

(51) Int. Cl.
G02B 27/01 (2006.01)
G02B 27/00 (2006.01)
G06F 3/01 (2006.01)
G06T 5/00 (2006.01)

(52) U.S. Cl.
CPC ..... *G02B 27/0172* (2013.01); *G02B 27/0093* (2013.01); *G06F 3/012* (2013.01); *G06F 3/013* (2013.01); *G06T 5/002* (2013.01)

(58) Field of Classification Search
CPC ....... G06T 5/002; G02B 27/0172; G02F 1/13; F21V 5/007; G06F 3/013
USPC ............................................ 349/13; 396/175
See application file for complete search history.

(56) References Cited

U.S. PATENT DOCUMENTS

| | | | |
|---|---|---|---|
| 2012/0121244 A1* | 5/2012 | Stavely | F21V 5/007 396/175 |
| 2014/0092327 A1* | 4/2014 | Machida | G02F 1/13 349/13 |
| 2017/0160798 A1* | 6/2017 | Lanman | G06T 5/002 |
| 2017/0358136 A1* | 12/2017 | Gollier | G02B 27/0172 |
| 2018/0032125 A1* | 2/2018 | Peterson | G06F 3/013 |

* cited by examiner

*Primary Examiner* — Abdul-Samad A Adediran
(74) *Attorney, Agent, or Firm* — Fenwick & West LLP (57) ABSTRACT

A head-mounted display (HMD) includes an optics block and an electronic display. A varifocal actuation block included in the HMD adjusts a location of an image plane by adjusting a position of the optics block or the electronic display. Responsive to the varifocal actuation block being powered down or a determination that the HMD is not being worn, the varifocal actuation block changes focus of light directed towards the electronic display by the optics block so the light is not focused on the electronic display. For example, the varifocal actuation block maximizes defocusing of light on the electronic display by the optics block. Additionally, when the HMD is powered on, the varifocal actuation block may also reposition the optics block and the electronic display relative to other so light directed towards the electronic display by the optics block illuminates different areas of the electronic display at different times.

18 Claims, 4 Drawing Sheets

MITIGATING LIGHT EXPOSURE TO ELEMENTS OF A FOCUS ADJUSTING HEAD MOUNTED DISPLAY

BACKGROUND

The present disclosure generally relates to head mounted displays presenting content to users, and specifically to modifying focus of light directed from optical elements in the head mounted display towards an electronic display.

Head mounted displays (HMDs) may present various types of content to users. For example, a HMD presents virtual environments to users. For example, stereoscopic images can be displayed on an electronic display inside the HMD to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts.

While some HMDs may include varifocal elements to compensate for vergence and accommodation, when such a HMD is not in use, the varifocal elements may focus ambient light onto the electronic display in the HMD. For example, when the HMD is not worn by a user, one or more varifocal elements of the HMD result in ambient light from the sun or another light source external to the HMD being focused on the electronic display in the HMD. This focusing of ambient light may damage one or more portions of the electronic display onto which the ambient light is focused.

SUMMARY

A head mounted display (HMD) presenting content to a user automatically adjusts its focus based on a location within a content presented by the virtual reality headset that the user views. In various embodiments, the HMD includes a varifocal actuation block that adjusts a focus of an optics block that directs image light from the electronic display element towards eyes of the user. In some embodiments, the varifocal actuation block changes a focal length of the optics block. The varifocal actuation block may mechanically change a distance between a lens system in the optics block and the electronic display element or change a shape of one or more lenses in the lens system in the optics block based on a location or object within the content presented by the electronic display where the user is looking.

To reduce a likelihood of damage to the electronic display from light directed towards the electronic display by the optics block when the HMD is not in use, the varifocal actuation block changes a focus of light directed from the optics block towards the electronic display. For example, the varifocal actuation block receives a signal that the varifocal actuation block is being powered down or a signal that the HMD is being powered off and changes the focal length of light directed from the optics block towards the electronic display in response to receiving the signal so the optics block does not focus light on the electronic display. Alternatively or additionally, the varifocal actuation block determines the HMD is not in use and changes the focal length of light directed from the optics block towards the electronic display so light directed towards the electronic display by the optics block is defocused when it is incident on the electronic display in response to the determination. In some embodiments, the varifocal actuation block determines the HMD is not in use in response to the electronic display not presenting content for at least a threshold amount of time or in response to determining the HMD has a specific orientation for at least a threshold amount of time.

In response to determining the varifocal actuation block or the HMD is being powered off or that the HMD is not in use, the varifocal actuation block alters the focus of light directed towards the electronic display by the optics block so a focal length differs from a distance between the optics block and the electronic display. Hence, light directed towards the electronic display by the optics block is focused in a plane other than a plane including the electronic display. In some embodiments, the varifocal actuation block changes the focal length of light directed towards the electronic display so the light is focused in a plane nearer to the optics block than the plane including the electronic display. Alternatively, the varifocal actuation block changes the focal length of light directed towards the electronic display so the light is focused in a plane farther from the optics block than the plane including the electronic display. In various embodiments, the varifocal actuation block changes the focal length of light directed towards the electronic display by the optics block is maximally defocused when incident on the electronic display, reducing the likelihood of the light directed towards the electronic display by the optics block damaging the electronic display.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
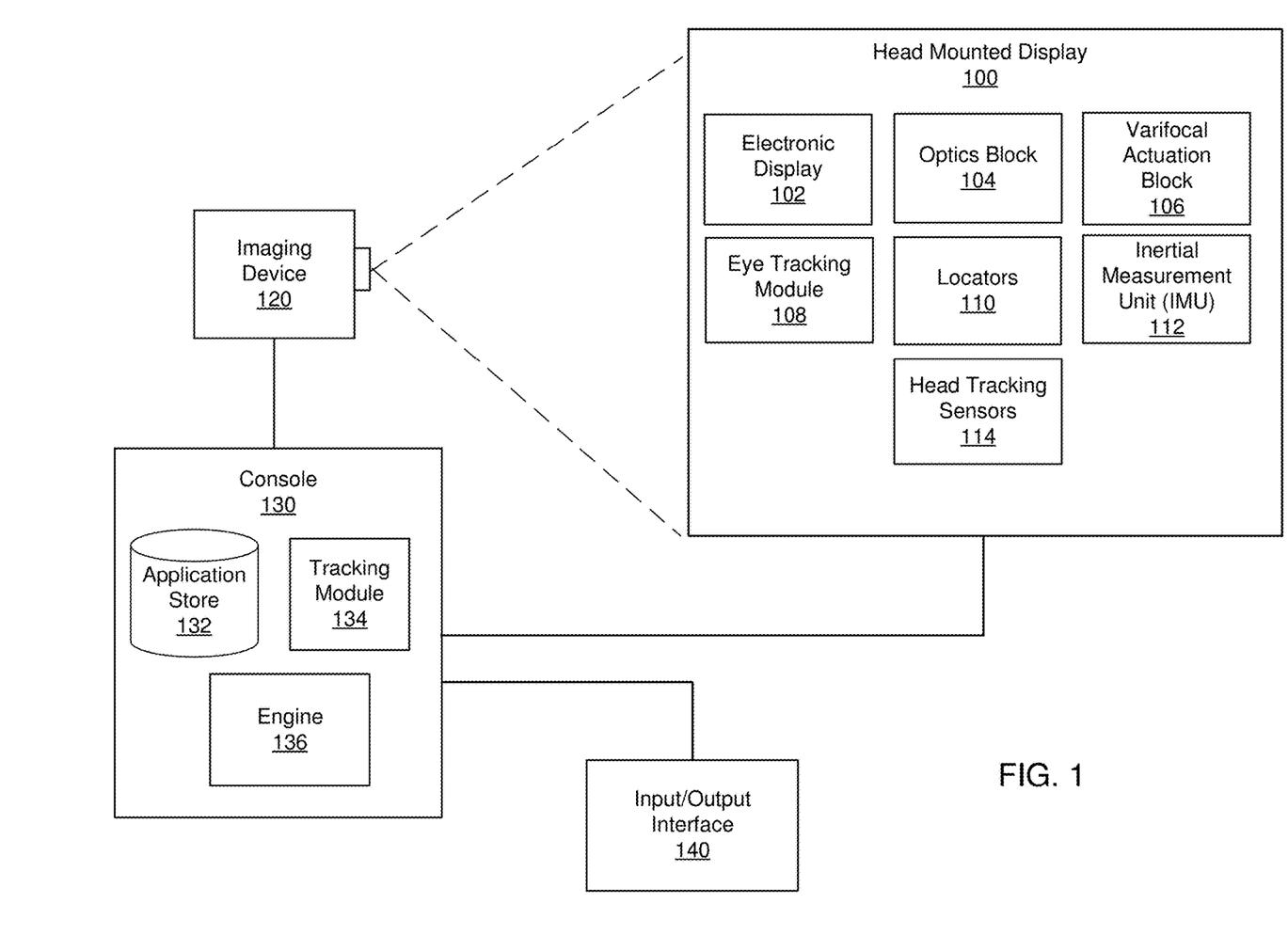
FIG. 1 shows an example system environment including a head mounted display (HMD) presenting content, in accordance with at least one embodiment.

FIG. 1 is a system environment in which a head mounted display (HMD) 100 operates. In this example, the system environment includes the HMD 100, an input/output interface 140, which are each coupled to a console 130. While FIG. 1 shows a single HMD 100, a single imaging device 120, and a single VR input/output interface 140, in other embodiments, any number of these components may be included in the system. For example, there may be multiple HMDs 100 each having an associated input/output interface 140 and being monitored by one or more imaging devices 120, with each HMD 100, input/output interface 140, and imaging device 120 communicating with the console 130. In alternative configurations, different and/or additional components may also be included in the system environment.

The HMD 100 presents content to a user. Example content includes images, video, audio, or some combination thereof. Audio content may be presented via a separate device (e.g., speakers and/or headphones) external to the HMD 100 that receives audio information from the HMD 100, the console 130, or both. The HMD 100 shown in FIG. 1 includes an electronic display 102, an optics block 104, a varifocal actuation block 106, an eye tracking module 108, one or more locators 110, an internal measurement unit (IMU) 112, and one or more head tracking sensors 114.

The optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by the optics block 104 allows the electronic display 102 to be physically smaller, to weigh less, and to consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

In various embodiments, the optics block 104 is designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to the electronic display 102 for display is pre-distorted, and the optics block 104 corrects the distortion when it receives image light from the electronic display 102 generated based on the content.

The varifocal actuation block 106 includes a varifocal element causing the optics block 104 to vary the focal length (or optical power) of HMD 100 to keep a user's eyes in a zone of comfort as vergence and accommodation change. In one embodiment, the varifocal actuation block 106 physically changes a distance between the electronic display 102 and the optical block 104 by moving the electronic display 102 or the optical block 104 (or both). Alternatively, the varifocal actuation block 106 changes the focal length of the optics block 104 by adjusting one or more properties of one or more lenses. Example properties of a lens adjusted by the varifocal actuation block include: an optical path length, an index of refraction of a lens medium, a shape of a lens, and so forth. For example, the varifocal actuation block 106 changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of the HMD 100. Thus, the varifocal actuation block 106 may include actuators or motors that move the electronic display 102 or the optical block 104 on a track to change the distance between them or may include actuators and other components or mechanisms for changing the properties of one or more lenses included in the optics block 104. The varifocal actuation block 106 may be separate from or integrated into the optics block 104 in various embodiments.

In some embodiments, different states of the optics block 104 correspond to different focal lengths of the HMD 100 or to a combination of the focal length and eye position relative to the optics block 104. In operation, the optics block 104 may move in a range of ~5 mm with a positional accuracy of ~5 μm for a granularity of around 1000 focal lengths, corresponding to 1000 states of the optics block 104. Any number of states could be provided; however, a limited number of states accommodate the sensitivity of the human eye, allowing some embodiments to include fewer focal lengths. For example, a first state corresponds to a focal length of a theoretical infinity meters (0 diopter), a second state corresponds to a focal length of 2.0 meters (0.5 diopter), a third state corresponds to a focal length of 1.0 meters (1 diopter), a fourth state corresponds to a focal length of 0.5 meters (1 diopter), a fifth state corresponds to a focal length of 0.333 meters (3 diopter), and a sixth state corresponds to a focal length of 0.250 meters (4 diopter). The varifocal actuation block 106, thus, sets and changes the state of the optics block 104 to achieve a desired focal length.

As further described below in conjunction with FIGS. 4A and 4B, in various embodiments, the varifocal actuation block 106 changes a focus of the HMD 100 in response to determining the HMD 100 is being powered off or to determining the HMD 100 is not being used. After determining the HMD 100 is being powered off or is not being used, the varifocal actuation block 106 changes the focus of the HMD 100 so the optics block 104 does not focus incident light on the electronic display 102. For example, the varifocal actuation block 106 changes a focal length to differ from a distance between the optics block 104 and the electronic display 102 by at least a threshold amount. Changing the focus of the optics block 104 directing light towards the electronic display 102 prevents the optics block 104 from focusing ambient light, such as light from the sun or from another light source external to the HMD 100, on one or more portions of the electronic display 102 when the HMD 100 is powered off or is not in use. Defocusing light from a light source external to the HMD 100 (e.g., the sun) directed towards the electronic display 102 by the optics block 104 reduces potential damage to the electronic display 102 from ambient light directed towards the electronic display 102 when the HMD 100 is not in use.

The eye tracking module 108 tracks an eye position and eye movement of a user of the HMD 100. A camera or other optical sensor inside the HMD 100 captures image information of a user's eyes, and eye tracking module 108 uses the captured information to determine interpupillary distance, interocular distance, a three-dimensional (3D) position of each eye relative to the HMD 100 (e.g., for distortion adjustment purposes), including a magnitude of torsion and rotation (i.e., roll, pitch, and yaw) and gaze directions for each eye. In one example, infrared light is emitted within the HMD 100 and reflected from each eye. The reflected light is received or detected by the camera and analyzed to extract eye rotation from changes in the infrared light reflected by each eye. Many methods for tracking the eyes of a user can be used by the eye tracking module 108. Accordingly, the eye tracking module 108 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 108 integrates information from past measurements, measurements identifying a position of a user's head, and 3D information describing a scene presented by the electronic display element 102. Thus, information for the position and orientation of the user's eyes is used to determine the gaze point in a virtual scene presented by the HMD 100 where the user is looking.

Based on information from the eye tracking module 108, the varifocal actuation block 106 determines a vergence depth of a user's gaze based on the gaze point or an estimated intersection of the gaze lines determined by the eye tracking module 108. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the varifocal actuation block 106 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of the optics block 104 may be a function of the vergence or accommodation depth and the 3D position of each eye, so the optics block 104 brings objects in a scene presented by electronic display element 102 into focus for a user viewing the scene. Further, vergence and accommodation information may be combined to focus optics block 104 and to render synthetic depth of field blur.

Locators 110 are objects located in specific positions on the HMD 100 relative to one another and relative to a specific reference point on the HMD 100. A locator 110 may be a light emitting diode (LED), a corner cube reflector, a reflective marker, a type of light source that contrasts with an environment in which the HMD 100 operates, or some combination thereof. Active locators 110 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In various embodiments, locators 110 are located beneath an outer surface of the HMD 100, which is transparent to the wavelengths of light emitted or reflected by locators 110 or is thin enough not to substantially attenuate the wavelengths of light emitted or reflected by locators 110. Further, the outer surface or other portions of the HMD 100 can be opaque in the visible band of wavelengths of light. Thus, the locators 110 may emit light in the IR band while under an outer surface of the HMD 100 that is transparent in the IR band but opaque in the visible band.

The inertial measurement unit (IMU) 112 is an electronic device that generates fast calibration data based on measurement signals received from one or more head tracking sensors 114, which generate one or more measurement signals in response to motion of the HMD 100. Examples of head tracking sensors 114 include accelerometers, gyroscopes, magnetometers, other sensors suitable for detecting motion, correcting error associated with the IMU 112, or some combination thereof. Head tracking sensors 118 may be located external to the IMU 112, internal to the IMU 112, or some combination thereof.

Based on the measurement signals from the head tracking sensors 118, the IMU 112 generates fast calibration data indicating an estimated position of the HMD 100 relative to an initial position of the HMD 100. For example, head tracking sensors 118 include multiple accelerometers to measure translational motion (forward/back, up/down, left/right) and multiple gyroscopes to measure rotational motion (e.g., pitch, yaw, and roll). The IMU 112 can, for example, rapidly sample the measurement signals and calculate the estimated position of the HMD 100 from the sampled data. For example, the IMU 112 integrates measurement signals received from the accelerometers over time to estimate a velocity vector and integrates the velocity vector over time to determine an estimated position of a reference point on the HMD 100. The reference point is a point that may be used to describe the position of the HMD 100. While the reference point may generally be defined as a point in space, in various embodiments, reference point is defined as a point within the HMD 100 (e.g., a center of the IMU 112). Alternatively, the IMU 112 provides the sampled measurement signals to the console 130, which determines the fast calibration data.

The IMU 112 can additionally receive one or more calibration parameters from the console 130. As further discussed below, the one or more calibration parameters are used to maintain tracking of the HMD 100. Based on a received calibration parameter, the IMU 112 may adjust one or more IMU parameters (e.g., sample rate). In some embodiments, certain calibration parameters cause the IMU 112 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The imaging device 120 generates slow calibration data in accordance with calibration parameters received from the console 130. Slow calibration data includes one or more images showing observed positions of locators 110 that are detectable by the imaging device 120. In various embodiments, the imaging device 120 may include one or more cameras, one or more video cameras, other devices capable of capturing images including one or more locators 110, or some combination thereof. Additionally, the imaging device 120 may include one or more filters (e.g., for increasing signal to noise ratio). The Imaging device 120 is configured to detect light emitted or reflected from locators 110 in a field of view of the imaging device 120. In embodiments where locators 110 include passive elements (e.g., a retroreflector), the imaging device 120 may include a light source that illuminates some of or all of the locators 110, which retro-reflect the light towards the light source in imaging device 120. Slow calibration data is communicated from the imaging device 120 to the console 130, and the imaging device 120 receives one or more calibration parameters from the console 130 to adjust one or more imaging parameters (e.g., focal length, focus, frame rate, ISO, sensor temperature, shutter speed, aperture, etc.).

The input/output interface 140 is a device that allows a user to send action requests to the console 130. An action request is a request to perform a particular action. For example, an action request may be to start or end an application or to perform a particular action within the application. The input/output interface 140 may include one or more input devices. Example input devices include a keyboard, a mouse, a game controller, or any other suitable device for receiving action requests and communicating the received action requests to the console 130. An action request received by the input/output interface 140 is communicated to the console 130, which performs an action corresponding to the action request. In some embodiments, the input/output interface 140 may provide haptic feedback to the user in accordance with instructions received from the console 130. For example, haptic feedback is provided by the input/output interface 140 when an action request is received, or the console 130 communicates instructions to the input/output interface 140 causing the input/output interface 140 to generate haptic feedback when the console 130 performs an action.

The console 130 provides content to the HMD 100 for presentation to the user in accordance with information received from the imaging device 120, the HMD 100, or the input/output interface 140. In the example shown in FIG. 1, the console 130 includes an application store 122, a tracking module 134, and an engine 136. Some embodiments of the console 130 have different or additional modules than those described in conjunction with FIG. 1. Similarly, the functions further described below may be distributed among components of the console 130 in a different manner than is described here.

The application store 132 stores one or more applications for execution by the console 130. An application is a group of instructions, that when executed by a processor, generates content for presentation to the user. Content generated by an application may be in response to inputs received from the user via movement of the HMD 100 or via the input/output interface 140. Examples of applications include gaming applications, conferencing applications, video playback application, or other suitable applications.

The tracking module 134 calibrates the system environment using one or more calibration parameters and may adjust one or more calibration parameters to reduce error in determining position of the HMD 100. For example, the tracking module 134 adjusts the focus of the imaging device 120 to obtain a more accurate position for observed locators 110 on the HMD 100. Moreover, calibration performed by the tracking module 134 also accounts for information received from the IMU 112. Additionally, if tracking of the HMD 100 is lost (e.g., the imaging device 120 loses line of sight of at least a threshold number of the locators 110), the tracking module 134 re-calibrates some or all of the system environment components.

Additionally, the tracking module 134 tracks the movement of the HMD 100 using slow calibration information from the imaging device 120 and determines positions of a reference point on the HMD 100 using observed locators from the slow calibration information and a model of the HMD 100. The tracking module 134 also determines positions of the reference point on the HMD 100 using position information from the fast calibration information from the IMU 112 on the HMD 100. Additionally, the tracking module 134 may use portions of the fast calibration information, the slow calibration information, or some combination thereof, to predict a future location of the HMD 100, which is provided to the engine 136.

The engine 136 executes applications within the system environment and receives position information, acceleration information, velocity information, predicted future positions, or some combination thereof for the HMD 100 from the tracking module 134. Based on the received information, the engine 136 determines content to provide to the HMD 100 for presentation to the user, such as a virtual scene. For example, if the received information indicates that the user has looked to the left, the engine 136 generates content for the HMD 100 that mirrors or tracks the user's movement in a virtual environment. Additionally, the engine 136 performs an action within an application executing on the console 130 in response to an action request received from the input/output interface 140 and provides feedback to the user that the action was performed. The provided feedback may be visual or audible feedback via the HMD 100 or haptic feedback via the input/output interface 140.

Figure 2:
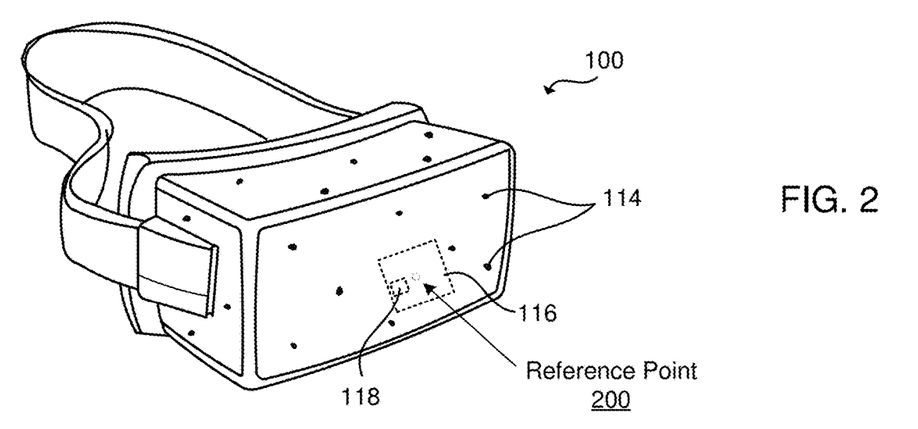
FIG. 2 shows a diagram of a head mounted display (HMD), in accordance with at least one embodiment.

FIG. 2 is a diagram of the head mounted display (HMD) 100, in accordance with at least one embodiment. In this example, the HMD 100 includes a front rigid body and a band that goes around a user's head. The front rigid body includes one or more electronic display elements corresponding to electronic display 102, IMU 112, head tracking sensors 114, and locators 110. In this example, the head tracking sensors 114 are located within the IMU 112.

Figure 3:
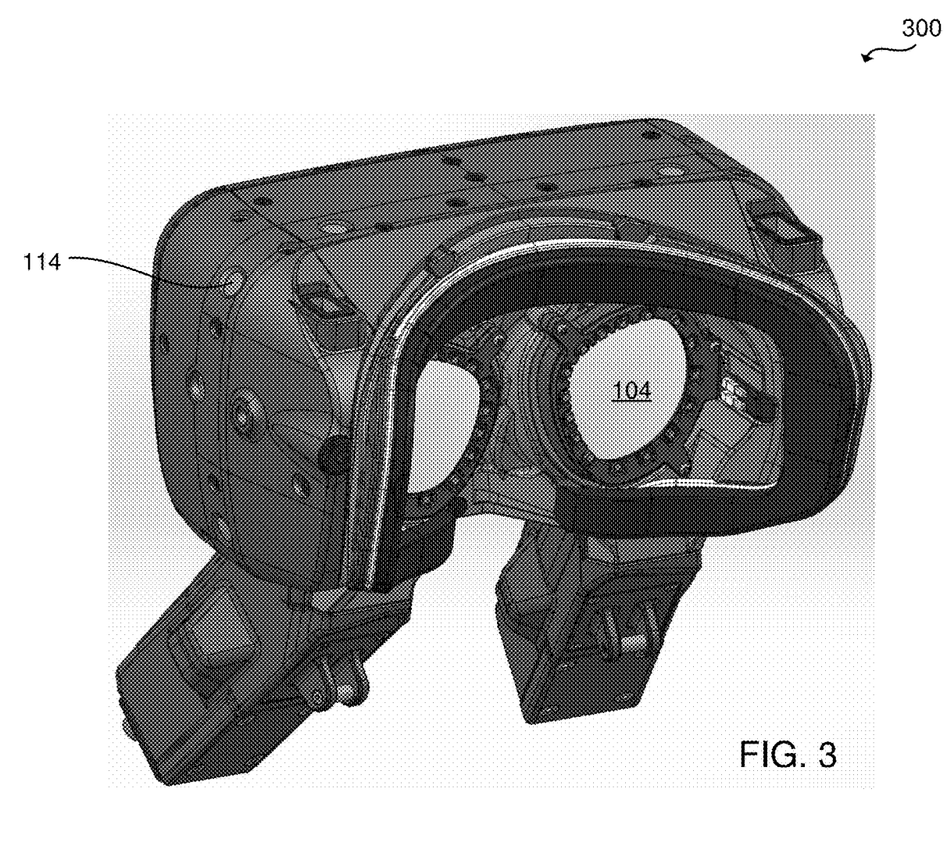
FIG. 3 shows a head mounted display (HMD), in accordance with at least one embodiment.

The locators 110 are located in fixed positions on the front rigid body relative to one another and relative to a reference point 200. In this example, the reference point 200 is located at the center of the IMU 112. Each of the locators 110 emits light that is detectable by the imaging device 120. Locators 110, or portions of locators 110, are located on a front side, a top side, a bottom side, a right side, and a left side of the front rigid body, as shown FIG. 2. FIG. 3 shows a rear perspective view looking into the head mounted display (HMD) 300 where an outer lens of the optics block 104 is visible. In this example, locators 110 are visible and provided, as discussed above, on the surface of VR headset 300 for detection by the imaging device 120.

Adjustment of Focal Length of Optics Block when the HMD is not in Use

Figure 4A:
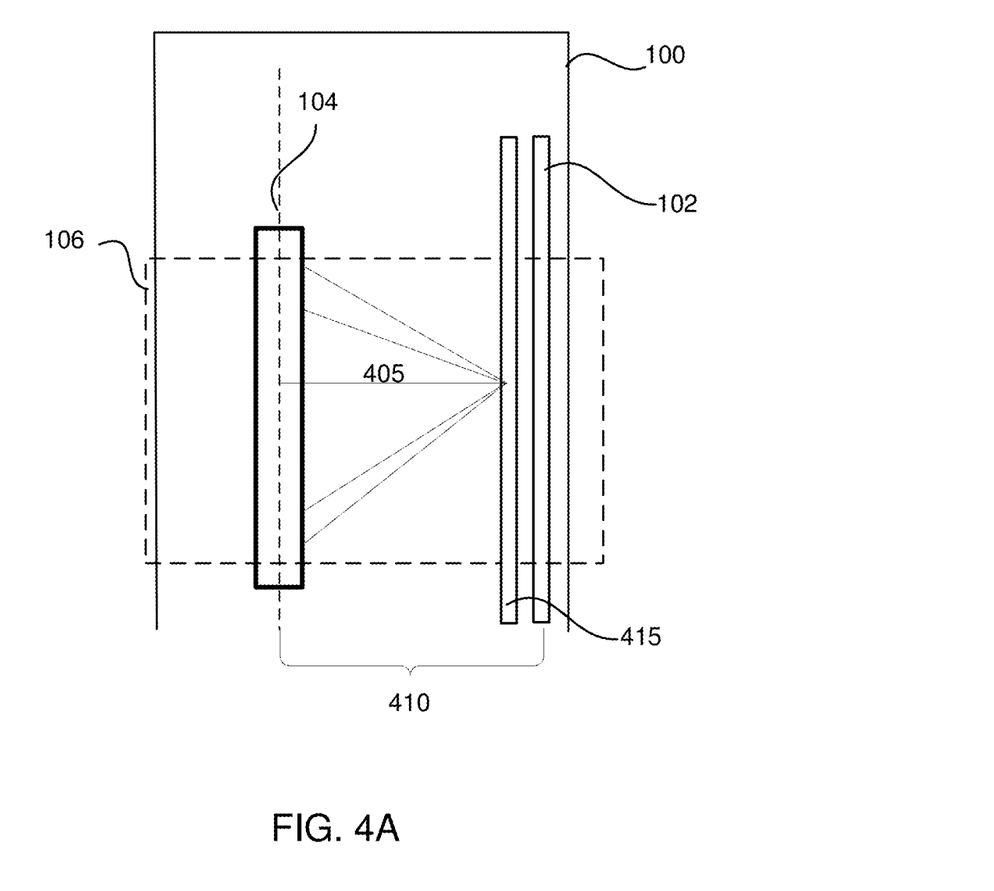
FIG. 4A is a cross-section of a front rigid body of a head mounted display (HMD) including a varifocal actuation block configured to alter a focal length of light directed from an optics block towards an electronic display of the HMD, in accordance with at least one embodiment.
Figure 4B:
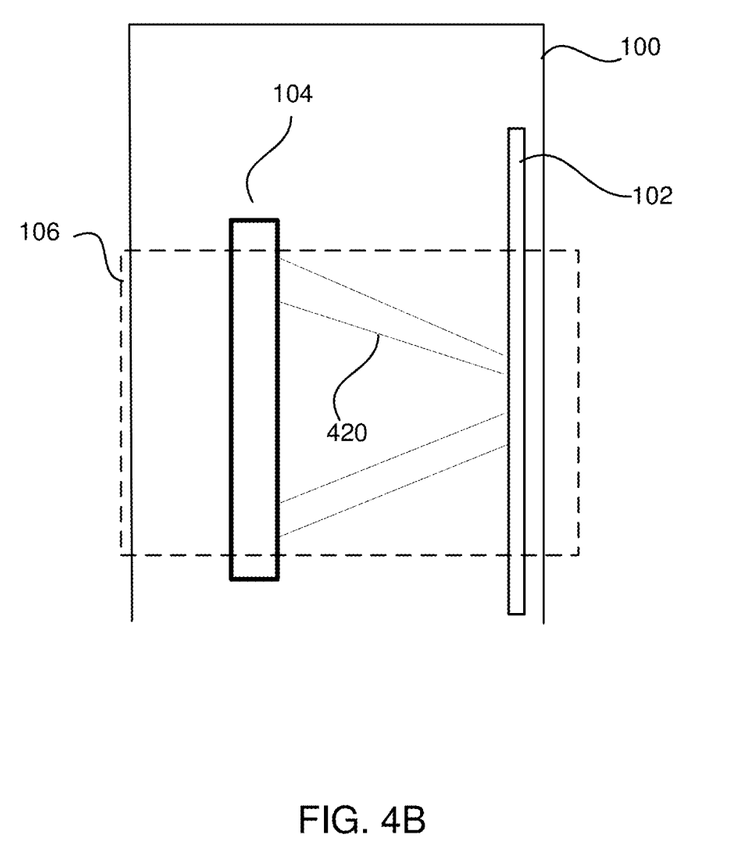
FIG. 4B is a cross-section of a front rigid body of a head mounted display (HMD) including a varifocal actuation block configured to defocus light directed from an optics block towards an electronic display of the HMD, in accordance with at least one embodiment.

FIG. 4A is a cross-section of a front rigid body of a head mounted display (HMD) 100 including a varifocal actuation block 106 configured to alter a focal length of light directed from an optics block 104 towards an electronic display 102 of the HMD 100. In various embodiments, the varifocal actuation block 106 changes the focus of light directed from the optics block 104 towards the electronic display 102 in response to determining power to the varifocal actuation block 106 is being shut off. For example, the varifocal actuation block 106 receives a signal that the varifocal actuation block 106 is being powered down or a signal that the HMD 100 is being powered off and changes the focal length of light directed from the optics block 140 towards the electronic display 102 in response to receiving the signal. Alternatively or additionally, the varifocal actuation block 106 determines the HMD 100 is not in use and changes the focal length of light directed from the optics block 140 towards the electronic display 102 in response to the determination. In some embodiments, the varifocal actuation block 106 determines the HMD 100 is not in use in response to the electronic display 102 not presenting content for at least a threshold amount of time or in response to determining the HMD 100 has a specific orientation for at least a threshold amount of time.

As shown in FIG. 4A, in response to determining the varifocal actuation block 106 or the HMD 100 is being powered off or that the HMD 100 is not in use, the varifocal actuation block 106 alters the focus of light directed towards the electronic display 102 by the optics block 104. In some embodiments, the varifocal actuation block 106 alters a focal length 405 of light directed towards the electronic display 102 by the optics block 140 so the focal length 405 differs from a distance 410 between the optics block 104 and the electronic display 102. Hence, light directed towards the electronic display 102 by the optics block 104 is focused in a plane 415 other than a plane including the electronic display 102. In the embodiment shown by FIG. 4, the varifocal actuation block 106 changes the focal length 405 of light directed towards the electronic display 102 so the light is focused in a plane 415 nearer to the optics block 104 than the plane including the electronic display 102. However, in other embodiments, the varifocal actuation block 106 changes the focal length 405 of light directed towards the electronic display 102 so the light is focused in a plane 415 farther from the optics block 104 than the plane including the electronic display 102. In various embodiments, the varifocal actuation block changes 106 the focal length 405 of light directed towards the electronic display 102 by the optics block 104 is maximally defocused when incident on the electronic display 102, reducing a likelihood of the light directed towards the electronic display 102 by the optics block 104 damaging the electronic display 102.

In various embodiments, the varifocal actuation block 106 changes the focus of light directed towards the electronic display 102 using any suitable method. For example, the varifocal actuation block 106 includes as an actuator or a motor and a track, and moves the optics block 104 or the electronic display 102 along the track to change the focal length 405 of light directed towards the electronic display 102 by the optics block 104. In various embodiments, the actuator or the motor of the varifocal actuation block 106 moves the optics block 104 or the electronic display 102 along the track so the focal plane 415 in which light directed towards the electronic display 102 from the optics block 104 is at least a threshold distance from the electronic display 102.

Alternatively, the varifocal actuation block 106 changes the focus of light directed towards the electronic display 102 by the optics block 104 by adjusting one or more properties of one or more lenses of the optics block 104 or of the varifocal actuation block 106. For example, the varifocal actuation block 106 changes the focus of light directed towards the electronic display 102 by the optics block 104 using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component to alter the focus of light directed towards the electronic display 102 by the optics block 104. In other embodiments, the varifocal actuation block 106 moves or translating two lenses positioned between the optics block 104 and the electronic display 102 relative to each other may also be used to change the focus of the light directed towards the electronic display 102 by the optics block 104. FIG. 4B shows an example implementation where the varifocal actuation block 106 adjusts one or more properties of one or more lenses of the optics block 104 of the varifocal actuation block 106 so light 420 directed towards the electronic display 102 by the optics block 104 is defocused when incident on the electronic display 102. In the example shown by FIG. 4B, the varifocal actuation block 106 defocuses light 420 directed towards the electronic display 102 so the light 420 is incident on a larger area of the electronic display 102 when the HMD 100 is being powered off or is not in use than when the HMD 100 is in use presenting content to a user. In various embodiments, the varifocal actuation block 106 defocuses the light 420 directed towards the electronic display 102 by any suitable amount to increase a surface area of the electronic display 102 on which the light 420 is incident. As further described above, any suitable parameter or parameters of one or more lenses in the optics block 104 or in the varifocal block 106 is modified by defocus the light 420 directed towards the electronic display 102 by the optics block 104, Additionally, in some embodiments, while the varifocal actuation block 106 or the HMD 100 is powered on or is presenting content, the varifocal actuation block 106 may modify relative positions of the optics block 104 and the electronic display 102 to light directed towards the electronic display 102 by the optics block 104 is incident on different portions of the electronic display 102 at different times. For example, the varifocal actuation block 106 repositions the electronic display 102 relative to the optics block 104 while the HMD 100 is presenting content. As another example, the varifocal actuation block 106 repositions the optics block 104 relative to the electronic display 102 while the HMD 100 is presenting content. The varifocal actuation block 106 repositions the electronic display 102 and the optics block 104 relative to each other at a rate that is not perceptible to a user viewing content presented by the electronic display 102 via the HMD 100.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A head mounted display (HMD) comprising:
an electronic display element configured to display content to a user wearing the HMD;
an optics block having a first side facing the electronic display and a second side facing away from the electronic display configured to direct light from the electronic display element to an exit pupil of the HMD;
an eye tracking system including an image capturing element, the eye tracking system configured to determine an eye position of each eye of the user;
a varifocal actuation block configured to:
change a focus of the optics block directing light from the electronic display based on a vergence depth for the user determined from the eye position of each eye of the user;
determine power to the varifocal actuation block is being shut off, and
responsive to the determination that power to the varifocal actuation block is being shut off, change the focus of the optics block such that light entering the optics block from the second side is defocused at a location of the electronic display while the HMD is not in use.

2. The HMD of claim 1, wherein the determine power to the varifocal actuation block is being shut off comprises:
receive an instruction to power off the varifocal actuation block.

3. The HMD of claim 1, wherein the change the focus of the optics block such that light entering the optics block from the second side is defocused at the location of the electronic display while the HMD is not in use comprises:
change a focal length of the optics block directing light towards the electronic display so light directed to the electronic display by the optics block is maximally defocused when incident on the electronic display.

4. The HMD of claim 1, wherein the change the focus such that light entering the optics block from the second side is defocused at the location of the electronic display while the HMD is not in use comprises:
change a distance between the optics block and the electronic display.

5. The HMD of claim 4, wherein the change the distance between the optics block and the electronic display comprises:
move the optics block relative to the electronic display.

6. The HMD of claim 4, wherein the change the distance between the optics block and the electronic display comprises:
move the electronic display relative to the optics block.

7. The HMD of claim 1, wherein the change the focus such that light entering the optics block from the second side is defocused at the location of the electronic display while the HMD is not in use comprises:
change a shape of a lens included in the optics block.

8. The HMD of claim 7, wherein the change the shape of a lens included in the optics block comprises using at least one selected from a group consisting of: a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

9. The HMD of claim 1, wherein the varifocal actuation block is further configured to:
reposition the optics block relative to the electronic display while the varifocal actuation block is receiving power.

10. A head mounted display (HMD) comprising:
an electronic display configured to display content to a user wearing the HMD;
an optics block having a first side facing the electronic display and a second side facing away from the electronic display and configured to direct light from the electronic display element to an exit pupil of the HMD;
a varifocal actuation block configured to:
change a focus of the optics block directing light from the electronic display to the exit pupil of the HMD while the electronic display presents content to the user;
determine the HMD is not in use, and
responsive to the determination the HMD is not in use, change the focus of the optics block such that light entering the optics block from the second side is maximally defocused at a location of the electronic display while the HMD is not in use.

11. The HMD of claim 10, wherein the determine the HMD is not in use comprises:
determine the electronic display has not presented content for at least a threshold amount of time.

12. The HMD of claim 10, wherein the determine the HMD is not in use comprises:
determine the HMD has a specific orientation for at least a threshold amount of time.

13. The HMD of claim 10, wherein the determine the HMD is not in use comprises:
receive an instruction to power off the varifocal actuation block.

14. The HMD of claim 10, wherein the change the focus of the optics block such that light entering the optics block from the second side is defocused at the location of the electronic display while the HMD is not in use comprises:
change the focal length of the optics block directing light towards the electronic display causes light directed to the electronic display by the optics block to be maximally defocused when incident on the electronic display.

15. The HMD of claim 10, wherein the change the focus of the optics block such that light entering the optics block from the second side is defocused at the location of the electronic display while the HMD is not in use comprises:
change a distance between the optics block and the electronic display.

16. The HMD of claim 10, wherein the change the focus of the optics block such that light entering the optics block from the second side is defocused at the location of the electronic display while the HMD is not in use comprises:
change a shape of a lens included in the optics block.

17. The HMD of claim 16, wherein the change the shape of the lens included in the optics block comprises using at least one selected from a group consisting of: a shape-changing polymer lens, a liquid lens and electrowetting, an Alvarez-Lohmann lens, a deformable membrane mirror, a liquid crystal (electroactive) lens, a phase-only spatial light modulator (SLM), and any combination thereof.

18. The HMD of claim 10, wherein the varifocal actuation block is further configured to:

reposition the optics block relative to the electronic display while the varifocal actuation block is receiving power.

* * * * *

UNITED STATES PATENT AND TRADEMARK OFFICE
CERTIFICATE OF CORRECTION

PATENT NO. : 10,859,832 B1  
APPLICATION NO. : 15/992145  
DATED : December 8, 2020  
INVENTOR(S) : Douglas Robert Lanman et al.

Page 1 of 1

It is certified that error appears in the above-identified patent and that said Letters Patent is hereby corrected as shown below:

In the Claims

Column 11, Claim 1, Line 9, delete "head mounted" and insert -- head-mounted --, therefor.

Column 11, Claim 1, Line 12, delete "an optics block" and insert -- and optics block --, therefor.

Column 11, Claim 1, Line 29, delete "defocused ata" and insert -- defocused at a --, therefor.

Column 12, Claim 10, Line 11, delete "an optics block" and insert -- and optics block --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*